(12) United States Patent
Häussler et al.

(10) Patent No.: US 11,343,634 B2
(45) Date of Patent: May 24, 2022

(54) APPARATUS AND METHOD FOR RENDERING AN AUDIO SIGNAL FOR A PLAYBACK TO A USER

(71) Applicant: Fraunhofer-Gesellschaft zur Foerderung der angewandten Forschung e.V., Munich (DE)

(72) Inventors: Dominik Häussler, Erlangen (DE); Frederick Melville, Erlangen (DE); Dennis Rosenberger, Erlangen (DE); Stefan Döhla, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 17/077,740

(22) Filed: Oct. 22, 2020

(65) Prior Publication Data
US 2021/0044913 A1 Feb. 11, 2021

Related U.S. Application Data

(63) Continuation of application No. PCT/EP2019/060207, filed on Apr. 18, 2019.

(30) Foreign Application Priority Data

Apr. 24, 2018 (EP) .................................... 18169137

(51) Int. Cl.
*H04S 7/00* (2006.01)
*G06T 13/20* (2011.01)
(Continued)

(52) U.S. Cl.
CPC ............ *H04S 7/303* (2013.01); *G06T 13/205* (2013.01); *H04S 2400/01* (2013.01)

(58) Field of Classification Search
None
See application file for complete search history.

(56) References Cited

U.S. PATENT DOCUMENTS

| 9,332,372 B2 | 5/2016 | Meyer |
| 10,705,338 B2 | 7/2020 | Ben-Asher et al. |
| (Continued) | | |

FOREIGN PATENT DOCUMENTS

| CN | 101350931 | 1/2009 |
| CN | 103491397 | 1/2014 |
| (Continued) | | |

OTHER PUBLICATIONS

FaceTrackNoir. "FaceTracking with just your webcam or smartphone", (2010). Retrieved from http://facetracknoir.sourceforge.net/home/default.htm.
(Continued)

*Primary Examiner* — Qin Zhu
(74) *Attorney, Agent, or Firm* — Dicke, Billig & Czaja, PLLC

(57) ABSTRACT

An apparatus and method for rendering an audio signal for a playback to a user is disclosed. In one example, the apparatus is configured to determine information about an orientation of a head of the user using an optical sensor. The apparatus is configured to determine information about an orientation of the optical sensor using an orientation sensor which is arranged in a predetermined positional relationship with respect to the optical sensor. The apparatus is configured to consider the information about the orientation of the optical sensor when determining the information about the orientation of the head. The apparatus is configured to perform a spatial rendering of an audio signal in dependence on the information about the orientation of the head of the user.

24 Claims, 6 Drawing Sheets

(51) Int. Cl.
    *G06F 3/16*     (2006.01)
    *G06F 3/01*     (2006.01)

(56) References Cited

U.S. PATENT DOCUMENTS

| | | |
|---|---|---|
| 2009/0219224 A1 | 9/2009 | Elg |
| 2011/0164769 A1 | 7/2011 | Zhan et al. |
| 2011/0293129 A1 | 12/2011 | Dillen et al. |
| 2012/0200495 A1 | 8/2012 | Johansson |
| 2012/0249741 A1* | 10/2012 | Maciocci ............... G06T 15/503 348/46 |
| 2013/0041648 A1 | 2/2013 | Osman |
| 2014/0343946 A1 | 11/2014 | Torok et al. |
| 2015/0382130 A1 | 12/2015 | Connor et al. |
| 2015/0382131 A1 | 12/2015 | Kuehne et al. |
| 2016/0119731 A1 | 4/2016 | Lester, III |
| 2016/0134986 A1 | 5/2016 | Liu et al. |
| 2016/0212272 A1 | 7/2016 | Srinivasan et al. |
| 2016/0266865 A1* | 9/2016 | Tsingos ................ G06F 3/165 |
| 2019/0057529 A1* | 2/2019 | DiVerdi ................ H04L 67/38 |
| 2019/0075418 A1* | 3/2019 | Shi ..................... H04S 7/303 |
| 2020/0279407 A1* | 9/2020 | Liljeroos ............... G06T 11/00 |
| 2020/0382747 A1* | 12/2020 | Prins .................... G06F 3/012 |
| 2020/0404443 A1* | 12/2020 | Cardinaux .......... G06K 9/00832 |

FOREIGN PATENT DOCUMENTS

| | | |
|---|---|---|
| CN | 107211180 | 9/2017 |
| WO | 2009/106916 | 9/2009 |
| WO | 2017/191631 | 11/2017 |

OTHER PUBLICATIONS

Kronlacher, M. (2013). Ambisonics plug-in suite for production and performance usage. Retrieved from http://lac.linuxaudio.org/2013/papers/51.pdf.

Kronlachner, M. (2011). "Kinect Headtracking with OSC Support", Retrieved from http://www.matthiaskronlachner.com/?p=624.

Lambers, M. (2017). "A Library for Webcam-based Head Tracking" Retrieved from https://github.com/marlam/webcam-head-tracker-mirror.

"Optical Image Stabilization (OIS)—White Paper", , Nov. 17, 2013 (Nov. 17, 2013), XP055312066, Retrieved from the Internet: URL:http://www.rohm.com/documents/11303/41217/0IS-white-paper.pdf.

* cited by examiner

APPARATUS AND METHOD FOR RENDERING AN AUDIO SIGNAL FOR A PLAYBACK TO A USER

CROSS-REFERENCE TO RELATED APPLICATIONS

This application is a continuation of copending International Application No. PCT/EP2019/060207, filed Apr. 18, 2019, which is incorporated herein by reference in its entirety, and additionally claims priority from European Application No. EP 18169137.9, filed Apr. 24, 2018, which is also incorporated herein by reference in its entirety.

The present invention relates to an apparatus for rendering an audio signal, more specifically, an apparatus which is configured to perform a spatial rendering or sound field rendering of the audio signal of acoustic communication.

BACKGROUND OF THE INVENTION

Spatial audio processing for binaural rendering of spatial audio data has been widely adopted for headphone use in video gaming and virtual reality (VR), but yet to break into other applications such as audio communications, e.g., voice calls, conferencing and standard video consumption (i.e., non-360 degree). Though some applications using static binaural rendering of spatial audio data exist, user acceptance seems limited. The reason behind this is hypothesized to be that for spatial audio to be convincing, live positional information of the user's perspective may be actively applied during spatial processing. In order for the brain to be successfully tricked, the audio may respond with low latency to even the smallest of adjustments of the head position.

In a phone call, the remote participant(s)/user(s) can be rendered as a mono object (per participant/user), each with a unique three-dimensional position (e.g., spread out horizontally in front of the participant/user as listener) in order to give a realistic same-room feeling.

VR experiences with headphones achieve this using head tracking data (e.g., in the form of pitch angle, yaw angle, roll angle or as quaternions) obtained from inertial measurement units (IMU), including data from sensors, e.g., gyroscopes and accelerometers within the user's head-mounted display (HMD). If such sensors were commonly found already in consumer headphones, then everyday applications such as phone calls could also benefit from head-tracked spatial processing, but there are currently very few standalone headphones known with these sensors built in, and even fewer that make this data readily accessible to developers.

For example, using the video feed of a camera to extract head tracking data, and to use this data for binaural rendering of an audio signal has already been done on desktop computers in combination with the Microsoft™ Kinect™ camera (see, Kronlacher, M. (2013). *Ambisonics plug-in suite for production and performance usage*. Retrieved from http://lac.linuxaudio.org/2013/papers/51.pdf, for instance). In addition, head tracking data extraction from the video feed of a common webcam is also known (see, for example, Lambers, 2017, https://github.com/marlam/webcam-head-tracker, and Face TrackNoir, 2010, https://git.marlam.de/gitweb/?p=webcam-head-tracker.git), but they do not propose to use it for spatial rendering of an audio signal. Furthermore, US 2009/0219224 A1 discloses a system for rendering a virtual environment in a multimedia application which relates to head tracking with mobile device and adaptive visual audio/video scenes.

However, with the above mentioned known technologies considered, certain problems are not yet solved, for example how to compensate for motion of the sensor itself such as usage in a dynamic mobile scenario (e.g., user walking around or in a moving vehicle).

BRIEF DESCRIPTION OF THE DRAWINGS

Embodiments of the present invention will be detailed subsequently referring to the appended drawings, in which.

DETAILED DESCRIPTION OF THE INVENTION

Figure 1:
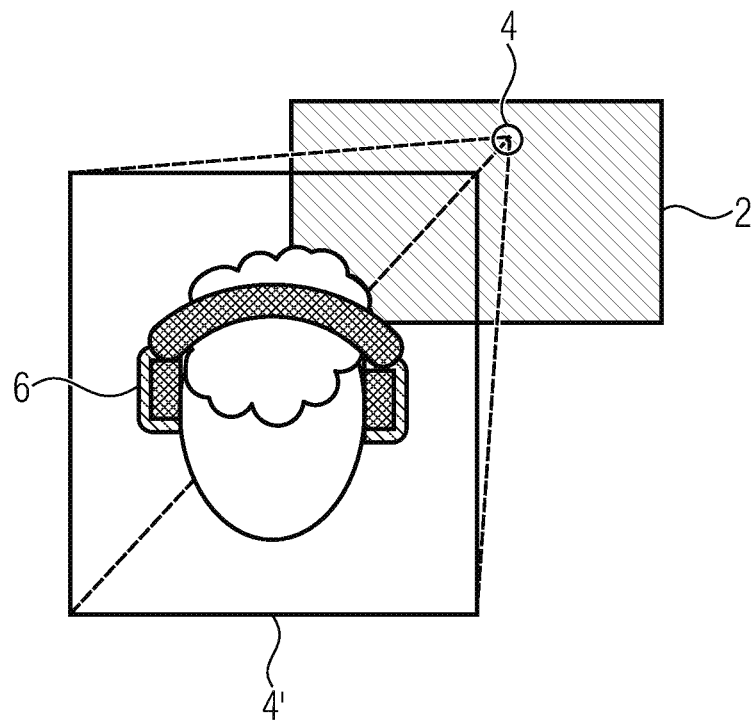
FIG. 1 shows a schematic illustration describing an example of an apparatus for rendering an audio signal for a playback to a user according to an embodiment of the present application.

An embodiment may have an apparatus for rendering an audio signal for a playback to a user, wherein the apparatus is configured to determine information about an orientation of a head of the user using an optical sensor; wherein the apparatus is configured to determine information about an orientation of the optical sensor in an Earth-fixed coordinate system using an orientation sensor which is arranged in a predetermined positional relationship with respect to the optical sensor; wherein the apparatus is configured to consider the information about the orientation of the optical sensor when determining the information about the orientation of the head by obtaining at least one parameter about the orientation of the head with respect to an Earth-fixed coordinate system, substantially independent from a current orientation of the optical sensor or from the orientation of the apparatus carrying or including the optical sensor; wherein the apparatus is configured to perform a spatial rendering of an audio signal in dependence on the information about the orientation of the head of the user.

Another embodiment may have a method for rendering an audio signal for a playback to a user, wherein the method includes determining information about an orientation of a head of the user using an optical sensor; wherein the method includes determining information about an orientation of the optical sensor in an Earth-fixed coordinate system using an orientation sensor which is arranged in a predetermined positional relationship with respect to the optical sensor; wherein the method includes considering the information about the orientation of the optical sensor when determining the information about the orientation of the head by obtaining at least one parameter about the orientation of the head with respect to an Earth-fixed coordinate system, substantially independent from a current orientation of the optical sensor or from the orientation of the apparatus carrying or including the optical sensor; wherein the method includes performing a spatial rendering of an audio signal in dependence on the information about the orientation of the head of the user.

Another embodiment may have a non-transitory digital storage medium having a computer program stored thereon to perform the inventive method when said computer program is run by a computer.

According to the present invention, an apparatus comprises an optical sensor and an orientation sensor for determining a head position of a user. Therefore, an apparatus, e.g., device is possible to determine the position of the head of the user by referencing the positional relationship between the optical sensor and the orientation sensor, and hence, it is possible to accurately determine the position of the head of the user. In addition, using the accurately determined position of the head of the user, it is possible to implement a low-latency adjustment for the spatial rendering and improve the user experience.

In accordance with embodiments of the present application, an apparatus for rendering an audio signal for a playback to a user, wherein the apparatus is configured to determine information about an orientation of a head of the user using an optical sensor, e.g. using a camera or using a user-facing moving image capture device, and/or using a depth sensor and/or using a visual face/head tracking sensor, for example, using camera-captured data for head tracking; wherein the apparatus is configured to determine information about an orientation of the optical sensor using an orientation sensor, for example, a gyroscope and/or a magnetic field sensor and/or a gravity sensor and/or an accelerometer and/or an optical sensor, etc., which is arranged in a predetermined positional relationship, e.g., mechanical relationship with respect to the optical sensor, for example, to enable the apparatus to be aware of its position and/or orientation in a "real world" or in an Earth-fixed coordinate system; wherein the apparatus is configured to consider the information about the orientation of the optical sensor when determining the information about the orientation of the head, for example, to obtain at least one parameter about the orientation of the head with respect to an Earth-fixed coordinate system, substantially independent from a current orientation of the optical sensor or from the orientation of the apparatus carrying or comprising the optical sensor; wherein the apparatus is configured to perform a spatial rendering of an audio signal, for example, for playback to the user via a speaker system or via a headset which is in communication with the apparatus, in dependence on the information about the orientation of the head of the user, for example, to adapt a virtual audio environment in dependence on the information about the orientation of the head of the user.

In accordance with embodiments of the present application, the apparatus is configured to perform a binaural rendering, e.g., for a headset worn by the user, or, e.g., of spatial audio data, in dependence on the information about the orientation of the head of the user, for example, considering a yaw angle or an azimuth angle between a head front direction of the user (e.g. a direction into which the user eyes or nose is pointing) and a direction from the user's head towards the apparatus or towards the optical sensor included within the apparatus, or towards a display of the apparatus, and/or considering a roll angle of the head of the user, and/or considering a pitch angle of the head of the user.

In accordance with embodiments of the present application, the apparatus comprises the optical sensor, e.g., a camera or a user-facing moving image capture device, and/or a depth sensor, wherein the optical sensor is arranged to track a head of the user, e.g. a position of the user's face, e.g., when the user is looking at a display of the apparatus.

In accordance with embodiments of the present application, the apparatus is configured to determine, for example, as a part of information about the orientation of the head of the user, a yaw angle information, for example, an angle value or a rotation matrix or a quaternion, describing an angle between a head front direction of the head of the user and a position of the apparatus, or, equivalently, a direction from the user's head to the apparatus or to the optical sensor; and/or wherein the apparatus is configured to determine, for example, as a part of the information about the orientation of the head of the user, a roll angle information, for example, an angle value or a rotation matrix or a quaternion describing a roll angle of the head of the user, e.g., with respect to a vertical direction, e.g. with respect to a direction of gravity; and/or wherein the apparatus is configured to determine, for example, as a part of the information about the orientation of the head of the user, a pitch angle information, for example, an angle value or a rotation matrix or a quaternion, describing a pitch angle of the head of the user, e.g. with respect to a horizontal alignment.

In accordance with embodiments of the present application, the apparatus is configured to determine, for example, as a part of information about the orientation of the head of the user, a yaw angle information $\varphi$ describing a yaw angle between a head front direction of the head of the user and a position of the apparatus such that the yaw angle information describes an azimuth angle between the head front direction of the head of the user and a direction from the head of the user, e.g. from a center of the head of the user, to the apparatus, for example, to the optical sensor included in the apparatus, for example, such that the yaw angle information describes an azimuth position of the apparatus when seen from the head of the user, taking into consideration the head front direction, i.e., the direction towards which the user has turned the head or the direction in which the nose of the user is pointing.

In accordance with embodiments of the present application, the apparatus is configured to at least partially compensate or correct for a deviation, e.g., angle $\varphi_{err}$, between the direction from the head of the user to the apparatus and a direction of an optical axis of the optical sensor, for example, using a processing of an image information obtained from the optical sensor.

In accordance with embodiments of the present application, the apparatus is configured to determine, for example, as a part of the information about the orientation of the head of the user a roll angle information $\varphi_{Head\,roll}$ describing a roll angle of the head of the user with respect to a vertical direction, e.g. with respect to a direction opposite of gravity, also designated with "up", or e.g. with respect to an Earth-fixed coordinate system or with respect to an Earth-fixed vertical direction, or with respect to a head-front direction, for example, such that the roll angle information describes an angle of a rotation of the head around an axis oriented in the head front direction, for example, in the case of no pitch, an angle between a vertical axis of the head of the user and the vertical direction "up", but independent from a roll angle of the apparatus or of the optical sensor, wherein the roll angle information of the head is used when performing the spatial rendering.

In accordance with embodiments of the present application, the apparatus is configured to at least partially compensate a roll angle $\varphi_{Device\_roll}$ of the apparatus, or of the optical sensor, e.g. with respect to the vertical direction, on the basis of the information about the orientation of the optical sensor when determining the roll angle information describing the roll angle of the head of the user, or optionally, to at least partially compensate the (whole) orientation of the apparatus or of the optical sensor, for example, such that the spatial rendering remains substantially unchanged if only the apparatus or the optical sensor is rolled but the head does not change its roll angle.

In accordance with embodiments of the present application, the apparatus is configured to determine, for example, as a part of the information about the orientation of the head of the user, a pitch angle information $\varphi_{pitch}$ describing a pitch angle of the head of the user with respect to a horizontal alignment, e.g. with respect to an Earth-fixed coordinate system or with respect to an Earth-fixed horizontal plane, for example, such that the pitch angle information describes an elevation angle of the head-front direction, but independent from a pitch angle of the apparatus or of the optical sensor, wherein the pitch angle information describing the pitch angle of the head is used when performing the spatial rendering.

In accordance with embodiments of the present application, the apparatus is configured to at least partially compensate the orientation of the apparatus or of the optical sensor on the basis of the information about the orientation of the optical sensor when determining the pitch angle information of the head of the user, for example, such that the determined pitch angle information represents the pitch angle of the head of the user with respect to an Earth-fixed horizontal plane substantially independent from the position of the apparatus comprising the optical sensor and substantially independent from an alignment or rotation of the apparatus comprising the optical sensor.

In accordance with embodiments of the present application, the apparatus is configured to determine the information about the orientation of the head on the basis of information from sensors, advantageously only from sensors, arranged within the apparatus or mechanically attached to the apparatus, i.e., without using information from any sensors attached to the head of the user or to a headset.

In accordance with embodiments of the present application, the apparatus is configured to determine the information about the orientation of the head on the basis of information from sensors arranged within the apparatus or mechanically attached to the apparatus, and on the basis of one or more additional sensors which are external to the apparatus, e.g. external to the main electronic device comprising the optical sensor and the orientation sensor, wherein the one or more additional sensors may, for example, be arranged in a headset or in earphones.

In accordance with embodiments of the present application, the apparatus is configured to consider information from the external sensors only if it is found that the information about the orientation of the head cannot be obtained reliably, or cannot be obtained at all, on the basis of the information from the optical sensor such that the one or more additional sensors serve as backup sensors in the determination of the orientation of the head of the user when the head of the user leaves a field of vision of the optical sensor.

In accordance with embodiments of the present application, the apparatus is configured to determine an acoustic front direction, for example, represented by a vector; also designated as an acoustic front axis, which is a projection of a direction, e.g. represented by a vector, from the head, for example, from a center of the user's head or from a center of gravity of the head, to the apparatus, for example, to the optical sensor, into a horizontal plane, for example, a plane perpendicular to a direction of gravity, wherein, for example, a vertical offset between the apparatus and a center of the head of the user is ignored, in order to keep a center axis of the virtual audio environment level with the head of the user, and wherein the apparatus is configured to perform the spatial rendering of the audio signal in dependence on the acoustic front direction, for example, to maintain a consistent virtual audio environment.

In accordance with embodiments of the present application, the apparatus is configured to determine an acoustic front direction, for example, represented by a vector; also designated as an acoustic front axis, which is a direction, e.g. represented by a vector, from the head, for example, from a center of the user's head or from a center of gravity of the head, to the apparatus, for example, to the optical sensor, and wherein the apparatus is configured to perform the spatial rendering of the audio signal in dependence on the acoustic front direction, for example, to maintain a consistent virtual audio environment.

In accordance with embodiments of the present application, the apparatus is configured to render a center of an audio scene, for example, a center speaker, to be or to be perceivable in the acoustic front direction, for example, such that the audio scene is centered in a direction determined by the position of the apparatus, but in a plane at a height of the head of the user, irrespective of whether the apparatus is positioned higher or lower than the head of the user.

In accordance with embodiments of the present application, the apparatus is configured to determine the pitch angle information describing a pitch angle with respect to the acoustic front direction, for example, such that the pitch angle is the angle between the head-front direction and the acoustic front direction.

In accordance with embodiments of the present application, the apparatus is configured to keep a center axis of virtual audio environment level with user's head.

In accordance with embodiments of the present application, the apparatus is configured to leave a difference in height between head of the user and the apparatus, for example, the optical sensor, unconsidered when determining the information about an orientation of the head, for example, by determining a pitch angle of user's head relative to horizontal plane and/or by ignoring or compensating for the vertical offset between apparatus and the user's head.

In accordance with embodiments of the present application, the apparatus is portable and/or wherein the apparatus is a mobile communication device, for example, a mobile phone.

In accordance with embodiments of the present application, the apparatus is configured to perform a spatial rendering of multiple audio signals which represent audio contributions from a plurality of participants of an audio conference or of an audio/video conference, and/or wherein the apparatus is configured to perform a spatial rendering of a broadcast, or content on local storage media, or streamed audio content, which may optionally come along with a video content which is rendered on a display of the apparatus.

In accordance with embodiments of the present application, the apparatus is configured to obtain information at which azimuthal position, for example, with reference to a display of the apparatus, and at which height or elevation, for example, with respect to the head of the user, an audio content should be rendered, and wherein the apparatus is configured to determine information about an azimuthal position of the apparatus from the user's perspective, e.g. yaw angle or yaw angle information, using information from the optical sensor and the information about the orientation of the optical sensor; and wherein the apparatus is configured to determine a parameter about the orientation of the head with respect to an Earth-fixed coordinate system, for example, a pitch parameter or a roll parameter, using the information from the optical sensor and the information about the orientation of the optical sensor; and wherein the apparatus is configured to render the audio content using the information about the azimuthal position and the parameter about the orientation of the head with respect to the Earth-fixed coordinate system and optionally also using a parameter describing an angle between an orientation of the apparatus and a direction from the head of the user to the apparatus.

In accordance with embodiments of the present application, a method for rendering an audio signal for a playback to a user, wherein the method comprises determining information about an orientation of a head of the user using an optical sensor, e.g. using a camera or using a user-facing moving image capture device, and/or using a depth sensor and/or using a visual face/head tracking sensor, for example, using camera-captured data for head tracking; wherein the method comprises determining information about an orientation of the optical sensor using an orientation sensor, for example, a gyroscope and/or a magnetic field sensor and/or a gravity sensor and/or an accelerometer and/or an optical sensor, etc., which is arranged in a predetermined positional relationship, e.g. mechanical relationship, with respect to the optical sensor, for example, to enable the apparatus to be aware of its position and/or orientation in a "real world" or in an Earth-fixed coordinate system; wherein the method comprises considering the information about the orientation of the optical sensor when determining the information about the orientation of the head, for example, to obtain at least one parameter about the orientation of the head with respect to an Earth-fixed coordinate system, substantially independent from a current orientation of the optical sensor or from the orientation of the apparatus carrying or comprising the optical sensor; wherein the method comprises performing a spatial rendering of an audio signal, for example, for playback to the user via a speaker system or via a headset which is in communication with the apparatus, in dependence on the information about the orientation of the head of the user, for example, to adapt a virtual audio environment in dependence on the information about the orientation of the head of the user.

Equal or equivalent elements or elements with equal or equivalent functionality are denoted in the following description by equal or equivalent reference numerals.

In the following description, a plurality of details is set forth to provide a more thorough explanation of embodiments of the present application. However, it will be apparent to one skilled in the art that embodiments of the present application may be practiced without these specific details. In other instances, well-known structures and devices are shown in block diagram form rather than in detail in order to avoid obscuring embodiments of the present application. In addition, features of the different embodiments described hereinafter may be combined with each other, unless specifically noted otherwise.

FIG. 1 illustrates an embodiment of the apparatus 2, comprising a front-facing camera 4, for rendering an audio signal for a playback to a user wearing a headphone 6. As described in FIG. 1, the user's face is directed to the front-facing camera 4 and a reference numeral 4' indicates a field of vision of the front-facing camera 4. A depth camera (e.g. using infrared projection in combination with infrared depth sensors to extract the depth map) may also be used instead of, or in addition to, the front-facing camera 4. In this embodiment, the apparatus 2 is a non-mobile device, i.e. a stationary device.

The front-facing camera 4 (e.g. an optical sensor) is used to track the position (and/or orientation) of the user's face, the positional information (and/or orientation information) is (optionally) transformed to be from the perspective of the user rather than the camera, and finally this positional data is applied during the spatial audio processing. Alternatively, the apparatus 2 further comprises an orientation sensor, for example, a gyroscope which assists in tracking the orientation of the user's face. That is, even if the stationary device does not change the position, a front-facing surface of the stationary device, e.g., display may be rotatable. Hence, an orientation of the stationary device may be also changeable and therefore, in case the display of the stationary device is rotatable, at least one orientation sensor is needed to accurately determine information about an orientation of a head of user in relation to the position (orientation) of the device.

The entire environment is defined by the relationship between the device (apparatus) and the user's head, with the active processing happening when the user is within the field of vision of the camera 4'.

Recent advancements in augmented reality (AR) technology, both hardware and software, make these tracking and transformation processes more accessible. The result is that the audio can use 3D spatial processing to complement the visual scene, with head tracking to improve the overall effect.

Figure 2:
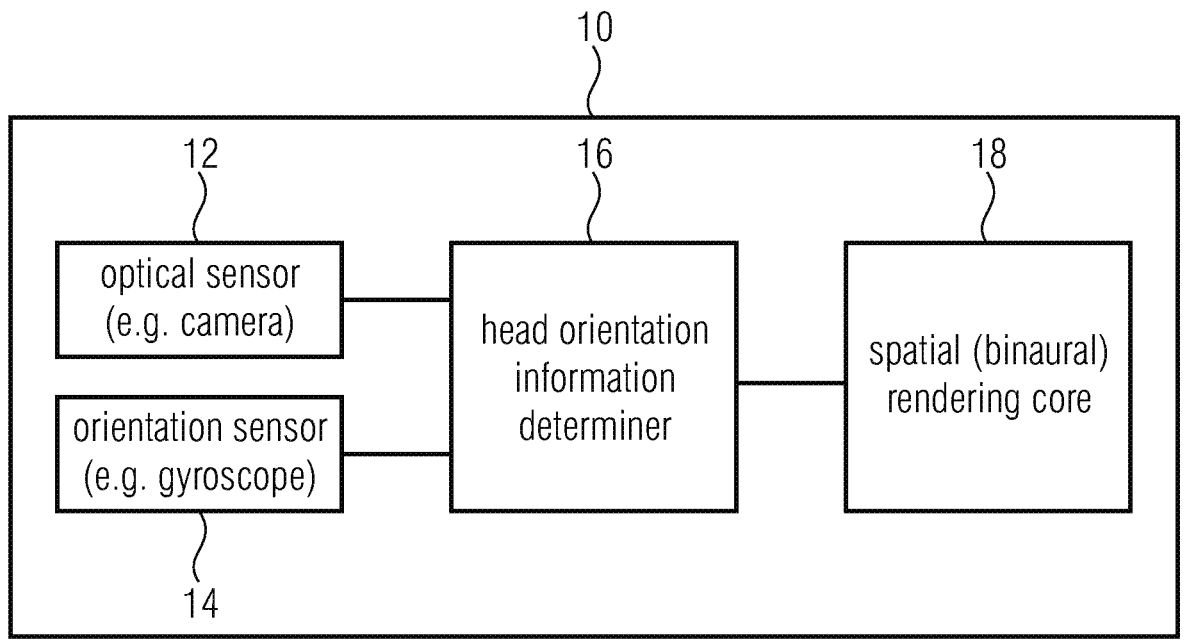
FIG. 2 shows a block diagram illustrating an example of the apparatus for rendering an audio signal for a playback to a user according to embodiments of the present application.

FIG. 2 shows a schematic diagram of the stationary apparatus (device) as well as the mobile apparatus (device) 10 comprising an optical sensor 12, e.g. a camera, an orientation sensor 14, e.g. a gyroscope, a head orientation information generator 16 and a spatial (binaural) rendering core 18. The orientation sensor 14 is arranged in a predetermined positional relationship with respect to the optical sensor 12. The device depicted in FIG. 2 is the stationary device and also the mobile device. The device of FIG. 2 may further or optionally include a display, a speaker, an antenna, a data transmitter, a microphone, etc.

In the case of a stationary device (e.g. desktop monitor) as shown in FIG. 1, when the user turns their head slightly away from the screen, the video scene (the device/apparatus) remains at the same position and therefore the audio scene should also remain fixed, achieved by applying the head rotation data, obtained from headphone-mounted sensors or stationary cameras, and compensating for the movement. This adds a new degree of realism because the audio scene reacts as the user is accustomed to in real life.

In the case of a mobile device (a mobile apparatus), the same logic as described above applies when the mobile device is stationary. However, with this configuration, the present application also conveniently accounts for movement of both the user and their device in free space, which is to be expected with mobile devices. This involves the use of additional sensors (for example, one or more orientation sensors) within the device (e.g. built-in accelerometer or gyroscope or built-in cameras or any combination thereof) to enable the device to be aware of its position (and/or orientation) in the real world (for example, with respect to an Earth-fixed coordinate system). As mentioned above, in case the display or surface of the stationary device is rotatable, the use of additional sensor, e.g. one or more orientation sensors within the device is needed.

The following describes the case of mobile device in detail and why the apparatus according to the present application provides practical advantages in case of the mobile device over using data from sensors built into headphones.

Embodiments of this later case, especially by using camera-captured data for head tracking, allow for large improvements in audio quality and overall user experiences by facilitating true spatial audio and do so robustly in a range of mobile environments.

This will be particularly beneficial, for example, for face-to-face video calls and video consumption (e.g. surround sound), where the need for spatial processing is apparent but the method of applying it not yet mature in the market.

The use of the apparatus according to the present application is not limited to video use cases, but it would also bring improved audio quality to audio-only applications, such as voice calls or 3D audio playback, where the locally captured video is used for head tracking but can be discarded as soon as the head tracking data has been extracted.

Figure 3:
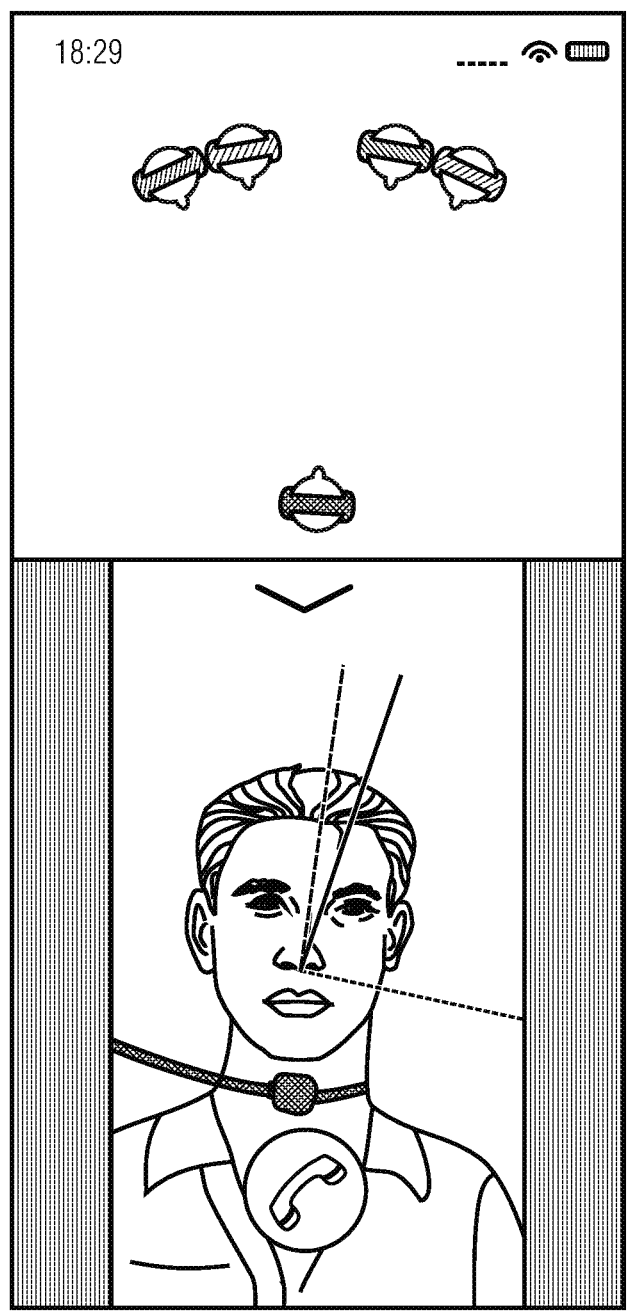
FIG. 3 shows a schematic illustration describing an example implementation of immersive conferencing using the apparatus according to an embodiment of the present application.

FIG. 3 schematically illustrates an example implementation of immersive conferencing, showing the local user via their front-facing camera and a 2D overhead representation of a conference call with four remote participants. Lines on the user face indicate an azimuthal position of user head.

In the mobile device, it is used the front-facing camera and/or depth sensor, along with device's additional sensors (e.g. built-in accelerometer and/or gyroscope) to gain knowledge of both the device's position (and/or orientation) and the position (and/or orientation) of the user's head within the real world (for example, with respect to an Earth-fixed coordinate system or with respect to a direction of gravity). This can be achieved with existing augmented reality (AR) frameworks, for example Apple's ARKit™ or Google's ARCore™.

This eliminates the need for sensors in the headphones, since the device can now provide the same head tracking data. A possible (but typically minor) disadvantage with this method is that the user may be (or should be) facing the front-facing sensor and within its field of vision in order for the head tracking data to be available. For applications such as face-to-face video calling or video consumption this is almost certainly the case anyway.

In case the user should temporarily fall outside the field of vision of the camera, options (which may optionally be implemented) include remaining at the most recent state or it would also be trivial for the application to fall back to a default state (return head rotation values to default forward position, for example). Yet another option (which may optionally be implemented) is to use motion data from other sensors, e.g. included in the headphones, which would only be used to estimate a head-tracking position, if the user is not inside the field of vision of the camera. It should be noted that any external sensor (e.g. a sensor which is not mechanically integrated into the apparatus, but, for example, attached to the headphones or to the body of the user) would be less optimal than a sensor inside the device due to additional transmission delays between external sensor and the device that limit the possible immersion. That is, the device comprises one or more of optical sensors, e.g. one or more of cameras and one or more of orientation sensors, e.g. one or more of gyroscopes.

However, the device according to the present application, i.e. the front-facing spatial processing also delivers one key advantage over using head tracking data from sensors built into headphones. For example, consider the scenario where a user makes a video call with spatial audio while walking along the street, as shown in FIG. 4, with their device held out at arm's length (see FIG. 4 (t1)), as is a common way of using video calls while on the go.

Figure 4:
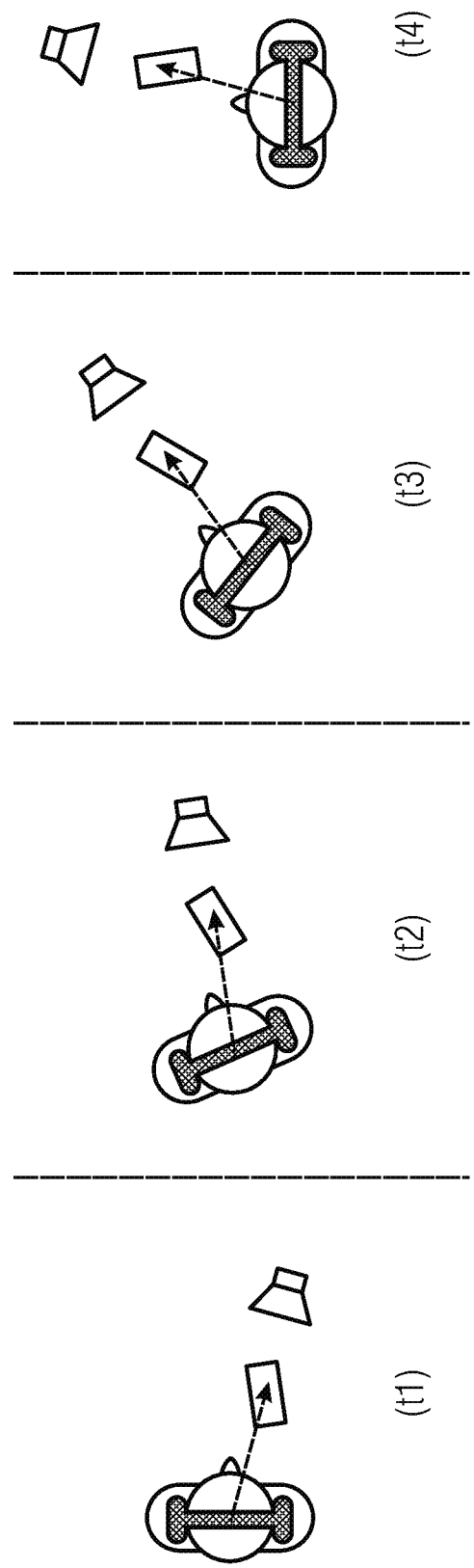
FIG. 4 shows a schematic illustration describing an example of user movement according to an embodiment of the present application.

Supposing they then turn 90 degrees around a street corner (t1, t2, t3, t4 of FIG. 4). In this scenario, although both the user and phone have rotated in real world space, the audio scene (one mono sound source in the example) would remain constant for the user, since the relationship between the position of the user's head and the position of the phone has not changed. The vector, originating from the user's head and passing though the camera of the device, will be referred to as the 'acoustic front' hereinafter in this description (wherein, optionally, the vertical spacing between the head and the camera may be left out of consideration). This (for example, the direction of the acoustic front, which may be represented by a vector) is the direction in space, where e.g. the center speaker of a 5.1 audio signal (5.1 surround sound) would be rendered to.

In the case where head-tracking data from sensors in the headphones is used, these sensors cannot automatically deduce whether the rotation was the user's head, or their whole body. Technically, it would be possible to compare the sensor values of the two devices (head-mounted sensors and device sensors) and use the commonly known calculus using the respective different orientations to compensate for this effect, but this would likely be more complicated and more error prone.

With the device as well as the method proposed here, the orientation and/or positional information is captured at a single point of reference—at the device (also designated as "apparatus"). It is also provided a robust user experience where other motion should be ignored, such as when the user is a passenger in a moving vehicle. It is compatible with any headset and easily implemented on modern devices featuring augmented reality (AR) support.

Different AR frameworks provide different coordinate systems to the application developers; hence this document defines the expected behavior independently of the chosen framework.

For the proposed behavior, for example, only the movements and rotations that are deemed beneficial to the user experience are provided to the spatial renderer, the remaining movements and rotations are negated by means of compensation.

In the following, different features and functionalities will be described, which can be used individually or in combination.

Figure 5:
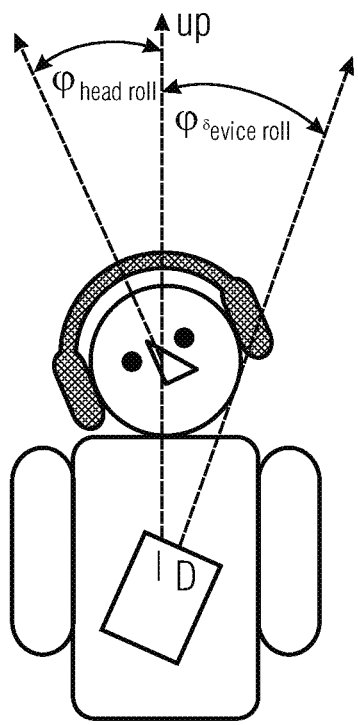
FIG. 5 shows a schematic illustration describing an example of a relationship between an orientation of the apparatus and an orientation of a head of the user in a roll angle according to an embodiment of the present application.

As shown in FIG. 5, the orientation of the device (or apparatus) 10 may not align with the up-axis (for example, a vertical direction, opposite to the direction of gravity), especially when the user is walking. The application should ensure that the AR framework compensates for the device roll angle, so it does not get used to render the audio signal. Only the head roll angle shall be used to configure the spatial renderer (which may, for example, perform the spatial rendering). Otherwise the audio scene would be rotated even though the user did not roll the head.

Figure 6:
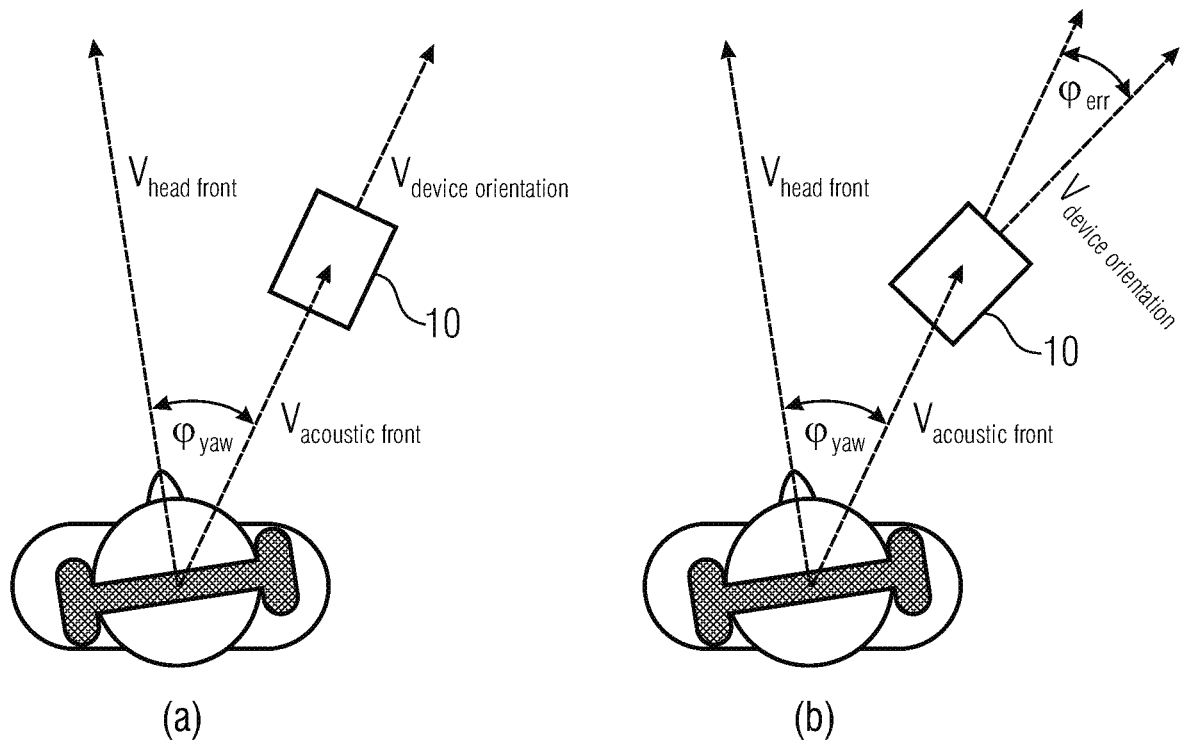
FIG. 6 shows a schematic illustration describing an example of a relationship between an orientation of the apparatus and an orientation of a head of the user in a yaw angle according to an embodiment of the present application.

The acoustic front is defined, for example shown in FIG. 5, as the vector between the user's head and the camera of the device 10 (wherein, optionally, the vertical spacing between the head and the camera may be left out of consideration, such that, for example, the acoustic front is a horizontal vector or direction). FIG. 6 (a) depicts the scenario where the orientation of the device aligns with the acoustic front vector. In this case, the angle between vector "head front" and vector "device orientation" are identical to the correct yaw angle. But once the device orientation changes, as shown in FIG. 6 (b), using this angle would cause an erroneous yaw value in the head rotation data used for the spatial rendering. That is, a deviation, the angle $\varphi_{err}$, between the direction from the head of the user to the apparatus and a direction of an optical axis of the optical sensor, is compensate or correct, for example, by using a processing of an image information obtained from the optical sensor. Accordingly, the device may, for example, determine $\varphi_{err}$, and consequently determine a correct yaw angle.

Figure 7:
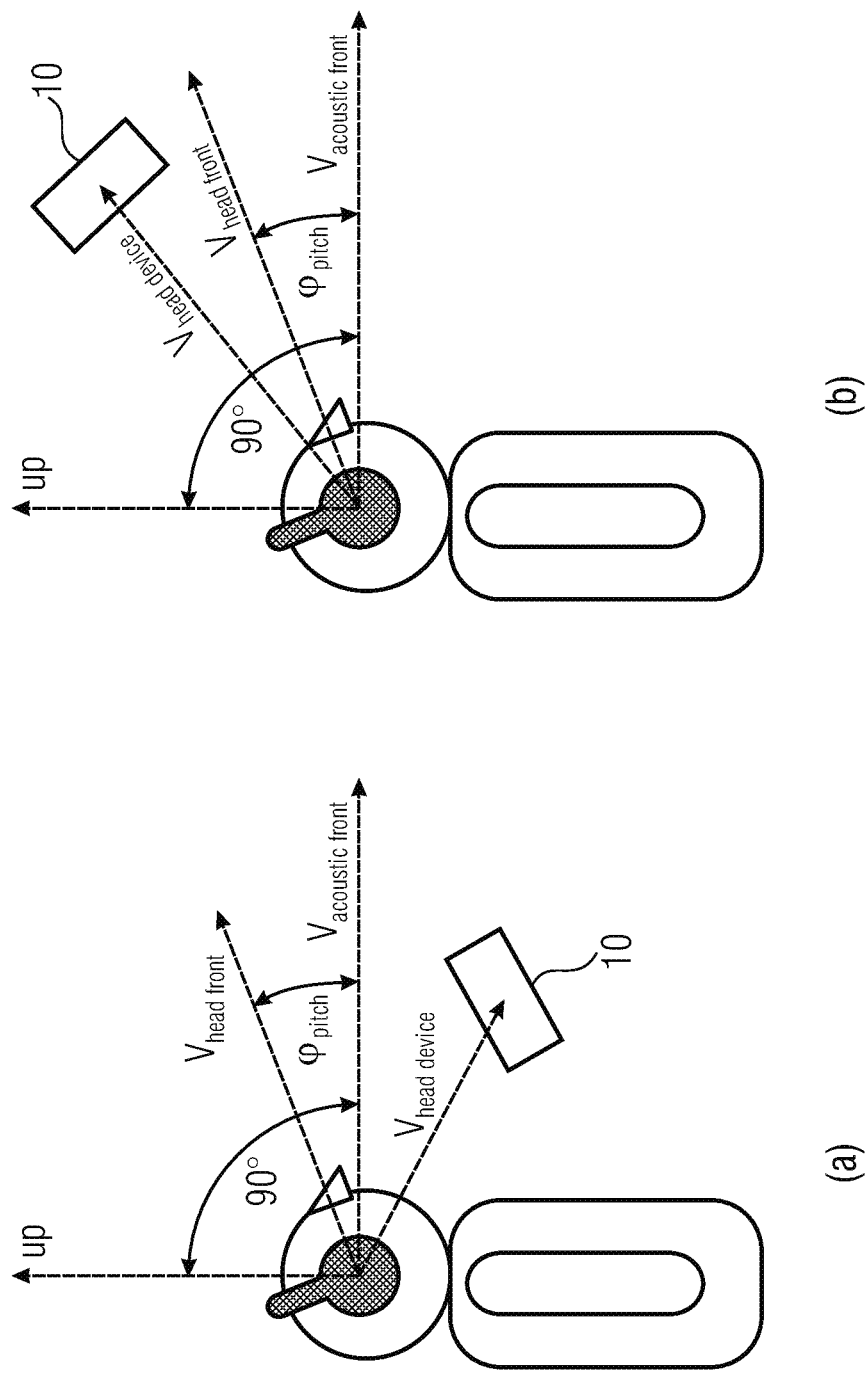
FIG. 7 shows a schematic illustration describing an example of a relationship between an orientation of the apparatus and an orientation of an acoustic front in a pitch angle according to an embodiment of the present application.

FIG. 7 depicts two side views of the user with the device and the pitch angle of the head rotation data. Opposed to the yaw angle in FIG. 6, for determining the pitch angle neither the device's position, nor its rotation is used (or reflected in a final result). That is, in case the position or the orientation of the device is changed, the vector of the acoustic front is not changed. The acoustic front is, for example, a vector at a 90 degree angle to the up-axis (for example, may lie in a horizontal plane) and the pitch angle, for example, refers to the angle between the vector head front and the acoustic front. For example, the device (or apparatus) may determine the pitch angle on the basis of these considerations or restrictions.

In this way, a mono audio object with zero elevation gets spatially rendered on eye level of the user. Using the vector "head device" instead of "acoustic front" to determine the pitch angle, as indicated in FIG. 7, would cause such an audio object to be attached to the device. For a 5.1 audio signal, this would cause the rear speakers to gain elevation when the user holds his phone below eye level, which is a degraded user experience compared to the proposed solution.

Figure 8:
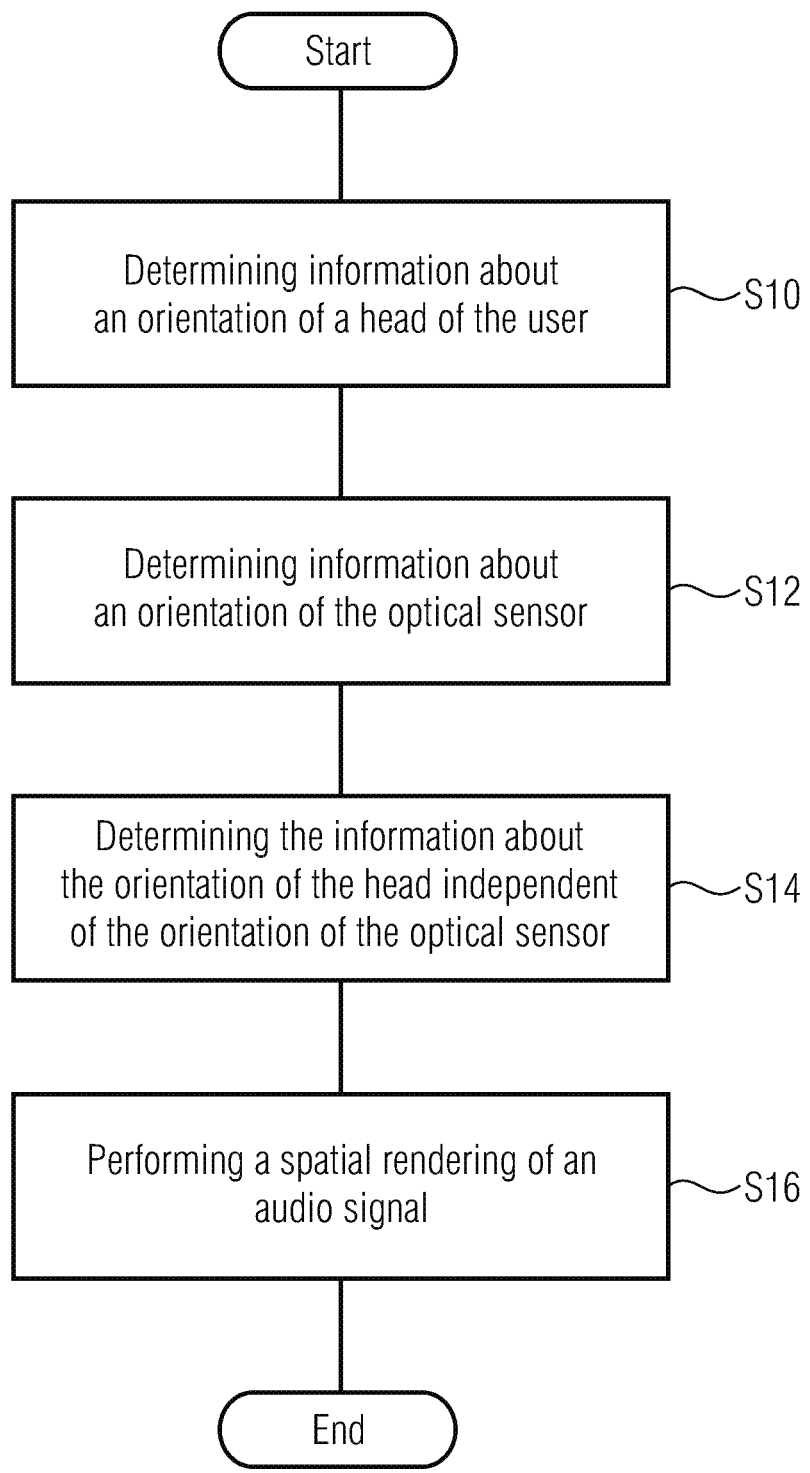
FIG. 8 shows a flowchart for an example of a method for rendering an audio signal for a playback to a user implemented by the apparatus shown in FIG. 2 according to the embodiments of the present application.

FIG. 8 shows a flowchart for an example of a method rendering an audio signal for a playback to a user implemented by the apparatus shown in FIG. 2 according to the embodiments of the present application. As indicated in FIG. 7, the method comprises a step determining information about an orientation of a head of the user using an optical sensor (S10). That is, the information about the orientation of the head of the user is determined by using an optical sensor 12, e.g. using a camera or using a user-facing moving image capture device, and/or using a depth sensor and/or using a visual face/head tracking sensor, for example, using camera-captured data for head tracking.

A step determining information about an orientation of the optical sensor 12 using an orientation sensor 14 is executed (S12). That is, for example, the information about an orientation of the optical sensor 12 is determined by using a gyroscope and/or a magnetic field sensor and/or a gravity sensor and/or an accelerometer and/or an optical sensor, etc., which is arranged in a predetermined positional relationship, e.g. mechanical relationship, with respect to the optical sensor 12, for example, to enable the apparatus to be aware of its position and/or orientation in a "real world" or in an Earth-fixed coordinate system.

Next, a step considering the information about the orientation of the optical sensor 12 when determining the information about the orientation of the head of the user is executed (S14). That is, for example, to obtain at least one parameter about the orientation of the head of the user with respect to an Earth-fixed coordinate system, substantially independent from a current orientation of the optical sensor 12 or from the orientation of the apparatus 10 carrying or comprising the optical sensor 12.

Then, a step performing a spatial rendering of an audio signal is executed (S16). That is, for example, for playback to the user via a speaker system or via a headset which is in communication with the apparatus 10, in dependence on the information about the orientation of the head of the user, for example, to adapt a virtual audio environment in dependence on the information about the orientation of the head of the user.

The proposed solution combines existing technologies with a newly defined acoustic front that makes an ideal virtual environment for mobile communication and media consumption, and provides improvements over current state of the art through being:

Truly Immersive: A new level of immersion can be achieved by the proposed apparatus or the proposed method according to the present application using low-latency adjustments to the spatial audio processing, even for the smallest of head movements, allowing more realistic spatial processing (not currently done in telephony, not even with conferencing applications that already use spatial processing without an HMD).

Robust while 'On The Go': Adaptive acoustic front allows for both the user and mobile device to move around while maintaining the optimal user experience (desirable head rotations) despite movements and rotations of the device (simultaneous movements in real world). In the method proposed within (WAVES-AUDIO-LTD, 2017) this is achieved by combining data sets from two distinct sensor groups (where a sensor group is a piece of hardware containing one or more sensors) that are allowed to rotate independently (e.g. one IMU on head, a separate IMU on the torso). This proposed solution improves on this by allowing the same or better functionality but using only one sensor group (e.g. mobile terminal, which may be considered as a "device" or as an "apparatus"), thereby reducing potential errors from this process of combining data sets from independently moving objects.

Accessible on common hardware: All of the above achievable today without an HMD but instead with commonly available consumer hardware (e.g. a mobile device and compatible with any pair of stereo headphones) in a way that is simply not currently done elsewhere.

In the following, some ideas underlying embodiments of the present invention will be briefly summarized. However, it should be noted that the general considerations, features, functionalities and details described in the following can optionally be introduced into any of the embodiments, both individually and taken in combination.

Embodiments create an Adaptive Acoustic Front for Immersive Audio Applications using a Mobile Device's Front-Facing Camera.

Embodiments according to the present invention create a method to achieve the benefits of spatial audio processing using a novel combination of existing technologies. This method involves a typical consumer environment of a user wearing headphones and a device with a front-facing camera. The front-facing camera is used to track the position of the user's face, the positional information is transformed to be from the perspective of the user rather than the camera, and finally this positional data is applied during the spatial audio processing. The result is that the audio can use 3D spatial processing to complement the visual scene, with head tracking to improve the overall effect. The entire environment is defined by the relationship between the device and the user's head, with the active processing happening when the user is within the field of vision of the camera. This method can e.g. be applied to improve the immersion of communication and media consumption applications.

In accordance with the embodiments of the present application, the position and the orientation of the head of the user (the head position) is determined by using sensors within the apparatus only. In other words, the head position is determined without any information from the device that may be mounted on the head, e.g., a head mounted display, a headphone or an earphone, attached to the user. Therefore, it is not necessary to transmit any data regarding the head position between the user device and the apparatus to determine the head position, and hence, it is possible to accurately determine the head position, since there is no transmission error regarding the head position data.

In accordance with the embodiments of the present application, the sensors are located only in the apparatus, i.e., it is not necessary to include any sensors to detect the head position within the user device. Therefore, it is possible to reduce a weight of the user device (e.g., sensors, batteries to supply power to sensors etc.) and to improve wearing comfort of the user. This also means that the present application is immediately compatible with existing headphones.

In a first aspect, a system (or apparatus) for rendering a virtual audio environment in a multimedia application comprising:
a) an electronic device with a user-facing moving image capture sensor,
b) sensors that provide the ability to determine orientation of the image capture device described in a),
c) a speaker system capable of reproducing a spatial audio signal [optional],
d) a controller that extracts head rotation data from the image sequence captured by a) and furthermore applies this data to the desired virtual audio environment and provides the rendered output to the speaker system described in c).

In a second aspect, the electronic device is portable. In a third aspect, the electronic device has an electronic display. In a fourth aspect, a depth sensor is used instead of/in addition to the user-facing moving image capture sensor. In a fifth aspect, the speaker system is a headset in communication with the electronic device.

In a sixth aspect, an additional sensor(s) external to the main electronic device are used to provide additional orientation or positional data of the user's head to the controller. In a seventh aspect, a method for rendering a virtual audio environment using a system comprising any combination of the first to sixth aspects, wherein the user's head orientation and positional data is used to adapt the virtual audio environment accordingly.

In an eighth aspect, any undesired offset in orientation or positional data of the electronic device is compensated for against the user's head orientation and positional data in order to maintain a consistent virtual audio environment.

In a ninth aspect, a method defines an 'acoustic front' axis as the direction vector from the center of the user's head towards the mobile device while the device is able to determine the user's head orientation or position using the visual face/head tracking sensor, and uses this axis to maintain a consistent virtual audio environment.

In a tenth aspect, the user's head orientation and positional data is used to adapt the virtual audio environment accordingly, except that the vertical offset between the device and the center of the user's head is ignored in order to keep the center axis of the virtual audio environment level with user's head.

In an eleventh aspect, the virtual audio environment consists of audio transported from a remote participant (or plurality of participants) rendered as audio objects in a real-time duplex-communication conference call, with local audio captured and transmitted to remote participants.

In a twelfth aspect, the virtual audio environment consists of produced audio content intended for broadcast/streaming. In a thirteenth and a fourteenth aspects, video element(s) is rendered in addition to the audio content.

In a fifteenth aspect, the method is implemented on a mobile computing device. In a sixteenth aspect, the virtual audio environment returns to a default state when it is not possible to determine the user's head orientation or position.

In a seventeenth aspect, the tracking of the user's face/head is improved using data from the external sensor(s) described in claim 6, to allow maintaining the virtual audio environment when it is not possible to determine the user's head orientation or position using the visual face/head tracking sensor alone.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive data stream can be stored on a digital storage medium or can be transmitted on a transmission medium such as a wireless transmission medium or a wired transmission medium such as the Internet.

Depending on certain implementation requirements, embodiments of the application can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present application can be implemented as a computer program product with a program code, the program code being operative for performing one of the methods when the computer program product runs on a computer. The program code may, for example, be stored on a machine readable carrier.

Other embodiments comprise a computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may, for example, be configured to be transferred via a data communication connection, for example via the internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for rendering an audio signal for a playback to a user, comprising:
   wherein the apparatus is configured to determine information about an orientation of a head of the user using an optical sensor;
   wherein the apparatus is configured to determine information about an orientation of the optical sensor in an Earth-fixed coordinate system using an orientation sensor which is arranged in a predetermined positional relationship with respect to the optical sensor;
   wherein the apparatus is configured to consider the information about the orientation of the optical sensor when determining the information about the orientation of the head by acquiring at least one parameter about the orientation of the head with respect to an Earth-fixed coordinate system, independent from a current orientation of the optical sensor or from the orientation of the apparatus carrying or comprising the optical sensor;
   wherein the apparatus is configured to perform a spatial rendering of an audio signal in dependence on the information about the orientation of the head of the user.

2. The apparatus according to claim 1,
   wherein the apparatus is configured to perform a binaural rendering in dependence on the information about the orientation of the head of the user.

3. The apparatus according to claim 1,
   wherein the apparatus comprises the optical sensor, wherein the optical sensor is arranged to track a head of the user.

4. The apparatus according to claim 1,
   wherein the apparatus is configured to determine yaw angle information describing an angle between a head front direction of the head of the user and a position of the apparatus;
   and/or wherein the apparatus is configured to determine a roll angle information describing a roll angle of the head of the user; and/or
   wherein the apparatus is configured to determine a pitch angle information describing a pitch angle of the head of the user.

5. The apparatus according to claim 1,
   wherein the apparatus is configured to determine yaw angle information describing a yaw angle between a head front direction of the head of the user and a position of the apparatus such that the yaw angle information describes an azimuth angle between the head front direction of the head of the user and a direction from the head of the user to the apparatus.

6. The apparatus according to claim 5,
   wherein the apparatus is configured to at least partially compensate a deviation between the direction from the head of the user to the apparatus and a direction of an optical axis of the optical sensor.

7. The apparatus according to claim 1,
   wherein the apparatus is configured to determine a roll angle information describing a roll angle of the head of the user with respect to a vertical direction or with respect to a head-front direction.

8. The apparatus according to claim 7,
   wherein the apparatus is configured to at least partially compensate a roll angle of the apparatus, or of the optical sensor on the basis of the information about the orientation of the optical sensor when determining the roll angle information describing the roll angle of the head of the user.

9. The apparatus according to claim 1,
wherein the apparatus is configured to determine a pitch angle information describing a pitch angle of the head of the user with respect to a horizontal alignment.

10. The apparatus according to claim 9,
wherein the apparatus is configured to at least partially compensate the orientation of the apparatus or of the optical sensor on the basis of the information about the orientation of the optical sensor when determining the pitch angle information of the head of the user.

11. The apparatus according to claim 1,
wherein the apparatus is configured to determine the information about the orientation of the head on the basis of information from sensors arranged within the apparatus or mechanically attached to the apparatus.

12. The apparatus according to claim 1,
wherein the apparatus is configured to determine the information about the orientation of the head on the basis of information from sensors arranged within the apparatus or mechanically attached to the apparatus, and on the basis of one or more additional sensors which are external to the apparatus.

13. The apparatus according to claim 12,
wherein the apparatus is configured to consider information from the external sensors only if it is found that the information about the orientation of the head cannot be acquired reliably on the basis of the information from the optical sensor.

14. The apparatus according to claim 1,
wherein the apparatus is configured to determine an acoustic front direction, which is a projection of a direction from the head to the apparatus into a horizontal plane, and
wherein the apparatus is configured to perform the spatial rendering of the audio signal in dependence on the acoustic front direction.

15. The apparatus according to claim 1,
wherein the apparatus is configured to determine an acoustic front direction, which is a direction from the head to the apparatus, and
wherein the apparatus is configured to perform the spatial rendering of the audio signal in dependence on the acoustic front direction.

16. The apparatus according to claim 14,
wherein the apparatus is configured to render a center of an audio scene to be in the acoustic front direction.

17. The apparatus according to claim 14,
wherein the apparatus is configured to determine the pitch angle information describing a pitch angle with respect to the acoustic front direction.

18. The apparatus according to claim 1,
wherein the apparatus is configured to keep a center axis of virtual audio environment level with user's head.

19. The apparatus according to claim 1,
wherein the apparatus is configured to leave a difference in height between head of the user and the apparatus unconsidered when determining the information about an orientation of the head.

20. The apparatus according to claim 1,
wherein the apparatus is portable and/or wherein the apparatus is a mobile communication device.

21. The apparatus according to claim 1,
wherein the apparatus is configured to perform a spatial rendering of multiple audio signals which represent audio contributions from a plurality of participants of an audio conference or of an audio/video conference, and/or
wherein the apparatus is configured to perform a spatial rendering of a broadcast or content on local storage media, or streamed audio content.

22. The apparatus according to claim 1,
wherein the apparatus is configured to acquire information at which azimuthal position and at which height or elevation an audio content should be rendered, and
wherein the apparatus is configured to determine information about an azimuthal position of the apparatus from the user's perspective using information from the optical sensor and the information about the orientation of the optical sensor; and
wherein the apparatus is configured to determine a parameter about the orientation of the head with respect to an Earth-fixed coordinate system using the information from the optical sensor and the information about the orientation of the optical sensor; and
wherein the apparatus is configured to render the audio content using the information about the azimuthal position and the parameter about the orientation of the head with respect to the Earth-fixed coordinate system.

23. A method for rendering an audio signal for a playback to a user, comprising:
determining information about an orientation of a head of the user using an optical sensor;
determining information about an orientation of the optical sensor in an Earth-fixed coordinate system using an orientation sensor which is arranged in a predetermined positional relationship with respect to the optical sensor;
considering the information about the orientation of the optical sensor when determining the information about the orientation of the head by acquiring at least one parameter about the orientation of the head with respect to an Earth-fixed coordinate system, independent from a current orientation of the optical sensor or from the orientation of the apparatus carrying or comprising the optical sensor; and
performing a spatial rendering of an audio signal in dependence on the information about the orientation of the head of the user.

24. A non-transitory digital storage medium having a computer program stored thereon to perform a method for rendering an audio signal for a playback to a user, the method comprising:
determining information about an orientation of a head of the user using an optical sensor;
determining information about an orientation of the optical sensor in an Earth-fixed coordinate system using an orientation sensor which is arranged in a predetermined positional relationship with respect to the optical sensor;
considering the information about the orientation of the optical sensor when determining the information about the orientation of the head by acquiring at least one parameter about the orientation of the head with respect to an Earth-fixed coordinate system, independent from a current orientation of the optical sensor or from the orientation of the apparatus carrying or comprising the optical sensor;
performing a spatial rendering of an audio signal in dependence on the information about the orientation of the head of the user,
when said computer program is run by a computer.

* * * * *